United States Patent
Jacobson et al.

(10) Patent No.: US 10,938,836 B2
(45) Date of Patent: *Mar. 2, 2021

(54) TRANSMITTING SECURE INFORMATION

(71) Applicant: HEWLETT PACKARD ENTERPRISE DEVELOPMENT LP, Houston, TX (US)

(72) Inventors: Erik Jacobson, Eagan, MN (US); Corneliu Boac, Eagan, MN (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 98 days.

This patent is subject to a terminal disclaimer.

(21) Appl. No.: 16/433,726

(22) Filed: Jun. 6, 2019

(65) Prior Publication Data

US 2020/0053101 A1 Feb. 13, 2020

Related U.S. Application Data

(63) Continuation of application No. 15/614,258, filed on Jun. 5, 2017, now Pat. No. 10,341,361.

(51) Int. Cl.
*H04L 29/06* (2006.01)
*G06F 21/57* (2013.01)
(Continued)

(52) U.S. Cl.
CPC .............. *H04L 63/126* (2013.01); *G06F 8/63* (2013.01); *G06F 21/57* (2013.01); *G06F 21/575* (2013.01);
(Continued)

(58) Field of Classification Search
CPC ..... H04L 63/126; H04L 67/141; H04L 9/083; H04L 67/34; H04L 63/08; H04L 63/061;
(Continued)

(56) References Cited

U.S. PATENT DOCUMENTS

| 5,349,643 A | 9/1994 | Cox et al. |
| 6,115,813 A | 9/2000 | Hobson et al. |

(Continued)

OTHER PUBLICATIONS

IBM, "Node Provisioning," (Research Paper), IBM Knowledge Center, 2013, https://www.ibm.com/support/knowledgecenter/SSDV55_4.1.1/manage_resources/nodes_provisioning.html.

*Primary Examiner* — Darren B Schwartz
(74) *Attorney, Agent, or Firm* — Hewlett Packard Enterprise Patent Department (57) ABSTRACT

In one example in accordance with the present disclosure, a method may comprise establishing, by a boot environment, a secure connection on a special port. An authentication key for the secure connection is preloaded into the boot environment. The method may comprise verifying, by the admin node, that the new node is marked for installation and transmitting, by the admin node, a secure key to the new node over the secure connection. The method may comprise requesting, by the boot environment, a secure bundle from the admin node, the secure bundle corresponding to the new node. The method may comprise decrypting, by the boot environment, the secure bundle using the secure key and requesting, by the boot environment, an installation image for the new node. The secure bundle contains secure information that is not included in the installation image.

20 Claims, 4 Drawing Sheets

(51) Int. Cl.
*H04L 29/08* (2006.01)
*H04L 9/08* (2006.01)
*G06F 8/61* (2018.01)

(52) U.S. Cl.
CPC ............ *H04L 9/083* (2013.01); *H04L 9/0891* (2013.01); *H04L 63/0435* (2013.01); *H04L 63/061* (2013.01); *H04L 63/08* (2013.01); *H04L 67/141* (2013.01); *H04L 67/34* (2013.01); *H04L 2209/24* (2013.01)

(58) Field of Classification Search
CPC ............ H04L 63/0435; H04L 9/0891; H04L 2209/24; G06F 21/575; G06F 21/57; G06F 8/63
See application file for complete search history.

(56) References Cited

U.S. PATENT DOCUMENTS

| | | |
|---|---|---|
| 6,272,628 B1 | 8/2001 | Aguilar et al. |
| 6,687,819 B1 | 2/2004 | Aguilar et al. |
| 7,299,354 B2 | 11/2007 | Khanna |
| 8,560,822 B1 | 10/2013 | Chan et al. |
| 10,037,201 B2 | 7/2018 | Herzi |
| 10,078,754 B1 | 9/2018 | Brandwine et al. |
| 10,154,023 B1 | 12/2018 | Nossik et al. |
| 2001/0008011 A1 | 7/2001 | Oba |
| 2003/0188176 A1 | 10/2003 | Abbondanzio et al. |
| 2004/0059928 A1 | 3/2004 | Fujiwara et al. |
| 2005/0028154 A1 | 2/2005 | Smith et al. |
| 2005/0114687 A1* | 5/2005 | Zimmer ................ G06F 9/4401 713/193 |
| 2005/0138409 A1 | 6/2005 | Sheriff et al. |
| 2005/0216668 A1 | 9/2005 | Kobayashi et al. |
| 2005/0273588 A1 | 12/2005 | Ong et al. |
| 2006/0026429 A1 | 2/2006 | Kudo et al. |
| 2006/0091196 A1 | 5/2006 | Durham et al. |
| 2006/0129797 A1 | 6/2006 | Durfee et al. |
| 2006/0156140 A1 | 7/2006 | Van Haegendoren et al. |
| 2006/0212664 A1 | 9/2006 | Takaragi |
| 2006/0248082 A1 | 11/2006 | Raikar et al. |
| 2007/0073978 A1 | 3/2007 | Lee |
| 2008/0104442 A1 | 5/2008 | Diao et al. |
| 2008/0313451 A1 | 12/2008 | Yu et al. |
| 2009/0083733 A1 | 3/2009 | Chen et al. |
| 2009/0319806 A1* | 12/2009 | Smith ................... G06F 21/575 713/193 |
| 2010/0082783 A1* | 4/2010 | Kohn ................... G06F 9/4416 709/222 |
| 2010/0306359 A1 | 12/2010 | DeHaan et al. |
| 2011/0078035 A1 | 3/2011 | Barton |
| 2012/0179904 A1 | 7/2012 | Dunn et al. |
| 2012/0284780 A1 | 11/2012 | Bergeson et al. |
| 2014/0089658 A1 | 3/2014 | Raghuram et al. |
| 2014/0317394 A1 | 10/2014 | Buhler et al. |
| 2015/0127931 A1 | 5/2015 | Kawarabayashi et al. |
| 2017/0039373 A1 | 2/2017 | Sasin et al. |

* cited by examiner

TRANSMITTING SECURE INFORMATION

CROSS-REFERENCE TO RELATED APPLICATION

This application is a continuation of U.S. patent application Ser. No. 15/614,258, which was filed on Jun. 5, 2017 and is hereby incorporated by reference in its entirety for all purposes.

BACKGROUND

A cluster environment may include a plurality of nodes managed by an admin node. A new cluster being added to the environment may obtain a system image containing data for operation in the environment.

RELATED PATENT DATA

Cross-Reference to Related Application

This application is a continuation of U.S. patent application Ser. No. 15/614,258, which was filed on Jun. 5, 2017 and is hereby incorporated by reference in its entirety for all purposes.

BRIEF DESCRIPTION OF THE DRAWINGS

The following detailed description references the drawings, wherein.

DETAILED DESCRIPTION

In a cluster environment, installation images for new nodes are often stored on an admin node and transferred to the new nodes for installation. These images may, however, include sensitive information, such as passwords and keys, that administrators do not want to be generally available. In order to protect this sensitive information, an admin node may verify the identity of a new node in order to make sure that the node is the entity that the admin node expects it to be. A malicious actor may exploit this process in order to get secrets and images from the admin node by pretending it is a node in the cluster.

Aspects of the system and method for transmitting secure information may address these issues. The systems and methods discussed herein may use an installation model where a new node leverages a boot environment to obtain secure information. The boot environment itself may contain an authentication key for a special install zone. The authentication key may be any sort of authentication information, such as, for example, a password, decryption key, address information, configuration information, etc. The boot environment may request a secure key for accessing secure information from the admin node. The secure information is transferred over a special port that is accessible using the key included in the boot environment. The installation images themselves do not contain the secure information.

Upon receiving the request, the admin node may verify that the node is marked for installation (and/or is diskless). If the verification is completed successfully, the admin node may then send the requested secure key. In this manner, the installation model helps protect against false requests from users on nodes. If the node isn't marked for installation and/or isn't diskless, the admin will not send the requested information.

The boot environment may also request a secure bundle corresponding to the node type and decrypt the secure bundle using the secure key received from the admin node. At this point, the boot environment may have all of the keys for installation/operation. Once completed, the boot environment may be erased from the node, thus preventing the node from accessing the special install zone. In the words, because it is the boot environment that has the authentication key for the special installation zone, once the boot environment is erased, the node loses access to the special install zone and can no longer obtain any of the secure information stored there.

As a result, an unauthorized user in the cluster may not be able to retrieve secure information because the transfer for the secrets is available when the node is marked for installation. The boot environment has the key that is needed for installation and the boot environment is removed after the keys are received. Once installed, the running nodes do not contain the secure information that allows them to access the admin node.

A system for transmitting secure information may comprise establishing, by a boot environment, a secure connection on a special port, wherein an authentication key for the secure connection is preloaded into the boot environment and verifying, by the admin node, that the new node is marked for installation. The system may also comprise transmitting, by the admin node, a secure key to the new node over the secure connection and requesting, by the boot environment, a secure bundle from the admin node, the secure bundle corresponding to the new node. The system may also comprise decrypting, by the boot environment, the secure bundle using the secure key and requesting, by the boot environment, an installation image for the new node, wherein the secure bundle contains secure information that is not included in the installation image.

Figure 1:
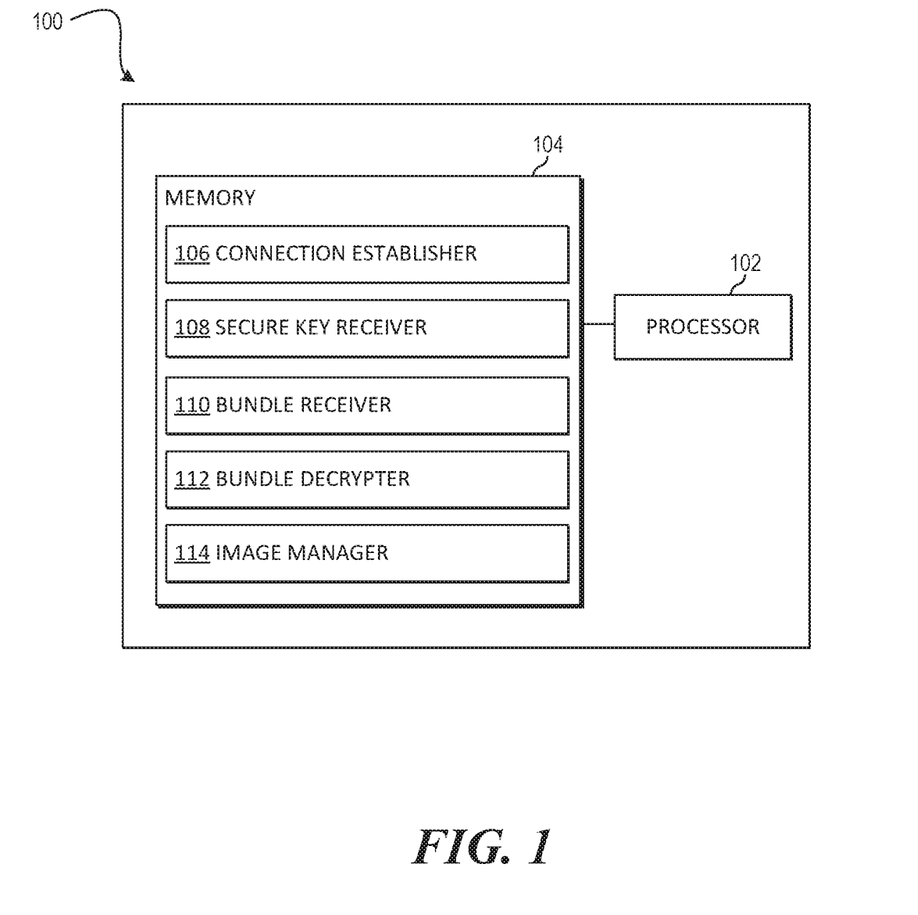
FIG. 1 is a block diagram of an example system for transmitting secure information.

FIG. 1 is a block diagram of an example system 100 for transmitting secure information. System 100 may include a processor 102 and a machine-readable medium 104 that may be coupled to each other through a communication link (e.g., a bus). Processor 102 may include a single or multiple Central Processing Units (CPU) or another suitable hardware processor(s). In some examples, machine-readable medium 104 stores machine readable instructions executed by processor 102 for system 100. Machine-readable medium 104 may include any suitable combination of volatile and/or non-volatile memory, such as combinations of Random Access Memory (RAM), Read-Only Memory (ROM), flash memory, and/or other suitable memory.

Machine-readable medium 104 stores instructions to be executed by processor 102 including instructions for connection establisher 106, secure key receiver 108, bundle receiver 110, bundle decrypter 112, image manager 114, and/or other components. According to various implementations, system 100 may be implemented in hardware and/or a combination of hardware and programming that configures hardware. Furthermore, in FIG. 1 and other Figures described herein, different numbers of components or entities than depicted may be used.

Processor 102 may execute connection establisher 106 to establish a secure connection between a boot environment and an admin node on a special port of the admin node. The secure connection may be between an admin node and a boot environment of a new node. Accordingly, the secure connection may be established by the boot environment, the admin node, etc. Specifically, the connection may be established with a special area of the admin node.

The authentication key for the secure connection may be preloaded into the boot environment. The admin node and boot environment may have keys used solely for installation purposes. The secure connection may be a secure shell (SSH) network protocol connection. Accordingly, the authentication key may be an SSH key. The special port may be a port that is solely used initial transfer of secure information to new nodes marked for installation. Accordingly, it may be assumed that any connection established on the port is for the transfer of secure information to new nodes marked for installation. The secure information may include passwords, addresses, bootstrapping information, configuration settings, port numbers, SSH keys, authorization keys, SSL certificates etc.

Processor 102 may execute secure key receiver 108 to receive a secure key from the admin node over the secure connection, wherein the secure key is for nodes marked for installation. The secure key may include, for example, a password. The secure key may be transmitted from the admin node to a root access level path of the new node and/or boot environment. The connection establisher 106 may disconnect the secure connection after the secure key has been transmitted to the new node. The connection may be disconnected by the admin node, new node and/or boot environment.

The admin node may perform a verification on the new node to determine if the new node is marked for installation and/or if the new node is diskless. As used herein, "diskless" may refer to a node that does not have any local storage (system disk, USB key, and Baseboard management controller (BMC), lights out controller storage, etc.) that is accessible by the boot environment. A system image may include an operating system or other operating parameters for the node. The verification process is discussed in further detail in reference to FIG. 3 below. In some aspects, the admin node may further verify if the secure information and/or a secure key has been previously sent to the new node. If the admin node determines that the secure information and/or secure key has previously been sent to the new node, the admin node may not send the secure information and/or secure key a second time. In these aspects, subsequent access to the secure key and/or secure information may be retrieved from storage of the new node.

The boot environment may request a secure key, such as a bootstrap secrets secure key, from the admin node. The admin node may verify that the node really is marked for installation (and/or is diskless) and then sends the corresponding encrypted bundle secure key. In some aspects, the transfer may be allowed to a certain root-only path on the new node. If the node isn't marked for installation and/or isn't diskless, the admin may not transfer the content.

Processor 102 may execute bundle receiver 110 to receive, at a memory of the boot environment, a secure bundle from the admin node. Bundle receiver 110 may request a secure bundle corresponding to the new node. Bundle receiver 110 may receive the secure bundle from the admin node. Once received by the boot environment, the secure bundle may be stored on a memory on a disk where the installation image is installed. The secure bundle may also be stored, for example, on a baseboard management chip (BMC), a lights out management controller, etc.

When the boot environment and/or new node subsequently accesses the secure information, the secure information may be accessed from the special partition instead of from the admin node. For example, an information handler may subsequently accesses the secure information from a special partition instead of receiving it from the admin node, wherein the special partition is on a disk where the installation image is installed.

The connection establisher 106 may disconnect the secure connection after the secure bundle has been transmitted to the new node. The connection may be disconnected by the admin node, new node and/or boot environment.

Processor 102 may execute bundle decrypter 112 to decrypt the secure bundle using the secure key. Processor 102 may execute image manager 114 to install an installation image for the new node. Because the secure information was transferred via the process described above, the new node does not have to get the secure information from installation image. Accordingly, the installation image might not contain the secure information.

Once this process is completed, the boot environment and/or connection information may be erased from the node, thus preventing the node from accessing secure content (secure bundle, secure keys, etc.) from the admin node in the future. In other words, because it is the boot environment that has the authentication key to access the secure connection, once the boot environment is erased, the node loses access to the special install zone and can no longer obtain any of the secure information stored there. A boot manager may delete the boot environment and/or the connection information from the new node. The deletion may occur upon installation of the installation image on the new node, upon the first boot of the new node using the installation image, etc.

Figure 2:
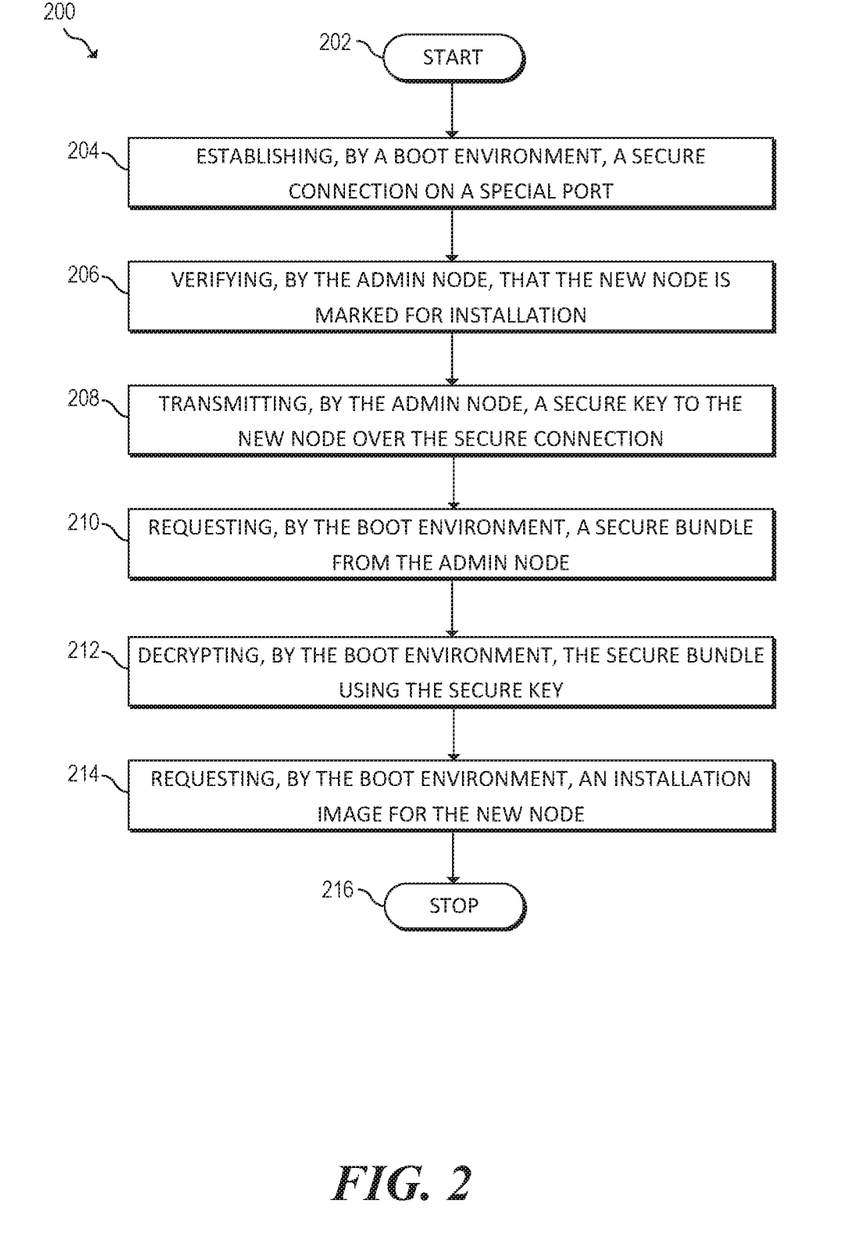
FIG. 2 is a flowchart of an example method for transmitting secure information for node installation.

FIG. 2 is a flowchart of an example method 200 for transmitting secure information for node installation. The flowchart represent processes that may be utilized in conjunction with various systems and devices as discussed with reference to the preceding figures, such as, for example, system 100 described in reference to FIG. 1 and/or system 400 described in reference to FIG. 4. While illustrated in a particular order, the flowchart is not intended to be so limited. Rather, it is expressly contemplated that various processes may occur in different orders and/or simultaneously with other processes than those illustrated. As such, the sequence of operations described in connection with FIG. 2 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. Although, certain blocks are described as being performed by certain actors (boot environment, admin node, etc.) this is for illustration purposes and in some aspects these blocks may alternatively or additionally be performed by other actors.

Method 200 may start at block 202 and continue to block 204, where the method may include establishing, by a boot environment, a secure connection on a special port. The authentication key for the secure connection may be preloaded into the boot environment. The special port may be a SSH port used for initial transfer of secure information to new nodes marked for installation. At block 206, the method may include verifying, by the admin node, that the new node is marked for installation. In some aspects, the admin node may also verify that the new node is diskless. At block 208, the method may include transmitting, by the admin node, a secure key to the new node over the secure connection. The secure key may be transmitted to a root access level path of the boot environment and/or new node. The secure connection may be disconnected after the secure key has been transmitted to the new node.

At block 210, the method may include requesting, by the boot environment, a secure bundle from the admin node, the secure bundle corresponding to the new node. Once received by the boot environment, the secure bundle may be stored on a special partition on a disk where the installation image is installed. The secure bundle may be stored, for example, on a baseboard management chip (BMC), a lights out management controller, etc. When the boot environment and/or new node subsequently accesses the secure information, the secure information may be accessed from the special partition instead of from the admin node.

At block 212, the method may include decrypting, by the boot environment, the secure bundle using the secure key. At block 214, the method may include requesting, by the boot environment, an installation image for the new node, wherein the secure bundle contains secure information that is not included in the installation image. The secure bundle may be used by the installation image installed on the new node. The boot environment and/or the connection information may be deleted from the node. The deletion may occur upon installation of the installation image on the new node, upon the first boot of the new node using the installation image, etc. The method may proceed to block 216, where the method may end.

Figure 3:
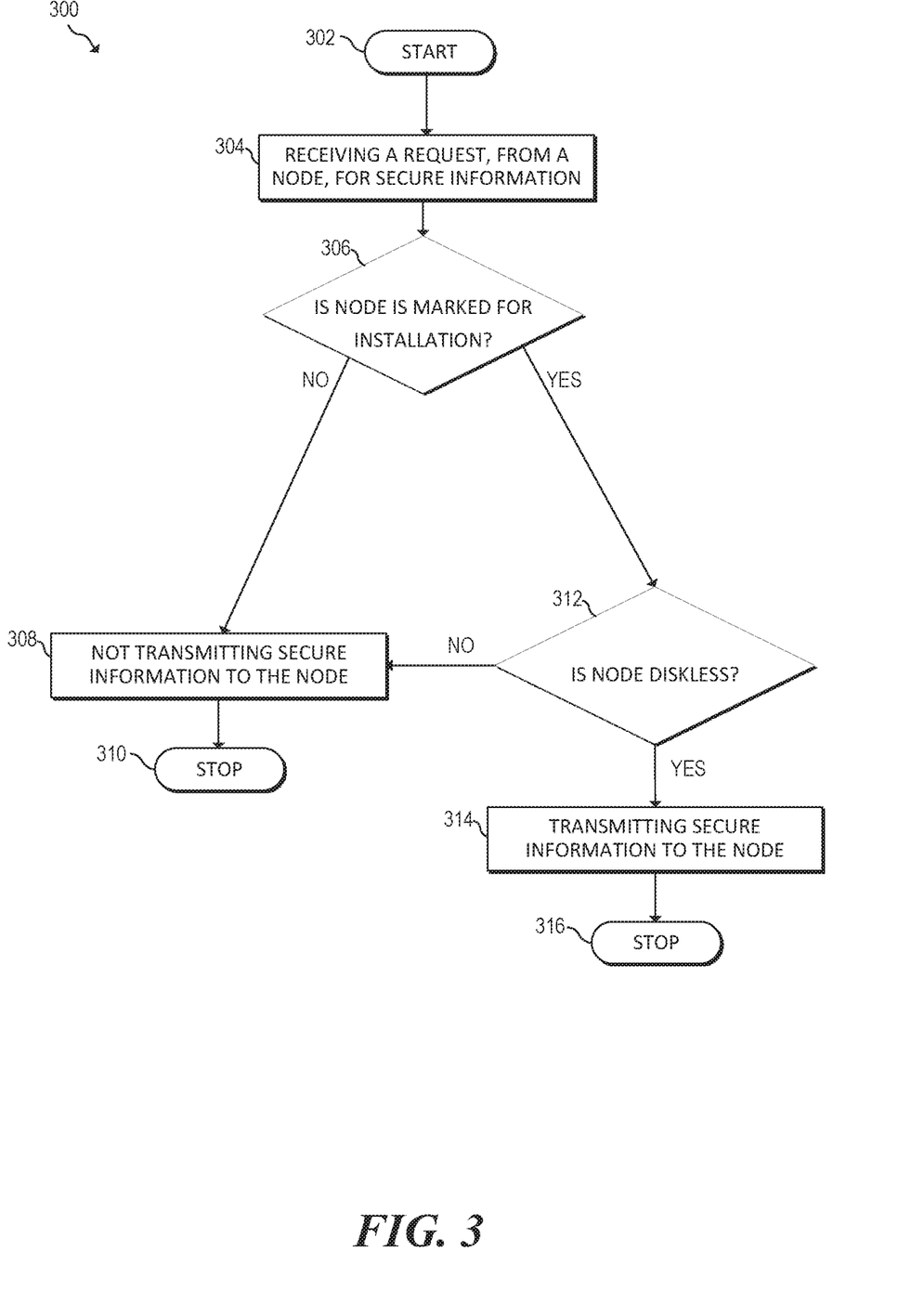
FIG. 3 is a flowchart of an example method for verifying a new node for installation.

FIG. 3 is a flowchart of an example method 300 for verifying a new node for installation. The flowchart represent processes that may be utilized in conjunction with various systems and devices as discussed with reference to the preceding figures, such as, for example, system 100 described in reference to FIG. 1 and/or system 400 described in reference to FIG. 4. While illustrated in a particular order, the flowchart is not intended to be so limited. Rather, it is expressly contemplated that various processes may occur in different orders and/or simultaneously with other processes than those illustrated. As such, the sequence of operations described in connection with FIG. 3 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

The method may start at block 302 and continue to block 304, where the method may include receiving, at the admin node, a request, from another node, for secure information, such as a secure key, secure bundle, etc. The request may be received on a secure connection on a special port. The secure connection may be between an admin node and a boot environment of a new node. The secure connection may be a secure shell (SSH) network protocol connection. At bock 306, the method may include determining, by the admin node, whether a node is marked for installation. If it is determined that the node is not marked for installation (NO branch of block 306), at block 308, the method may include not transmitting the secure information to the node. The method may proceed to block 310, where the method may end.

If it is determined that the node is marked for installation (YES branch of block 306), at block 312 the method may include determining whether the node is diskless. As used herein, "diskless" may refer to a node that does not have a system image installed. A system image may include an operating system or other operating parameters for the node. If it is determined that the node is not diskless (NO branch of block 312), at block 308, the method may include not transmitting the secure information to the node. The method may proceed to block 310, where the method may end.

If it is determined that the node is diskless (YES branch of block 314), at block 312 the method may include transmitting the requested secure information to the node. The secure information may be transmitted over the secure connection on the special port. The method may proceed to block 316, where the method may end.

Figure 4:
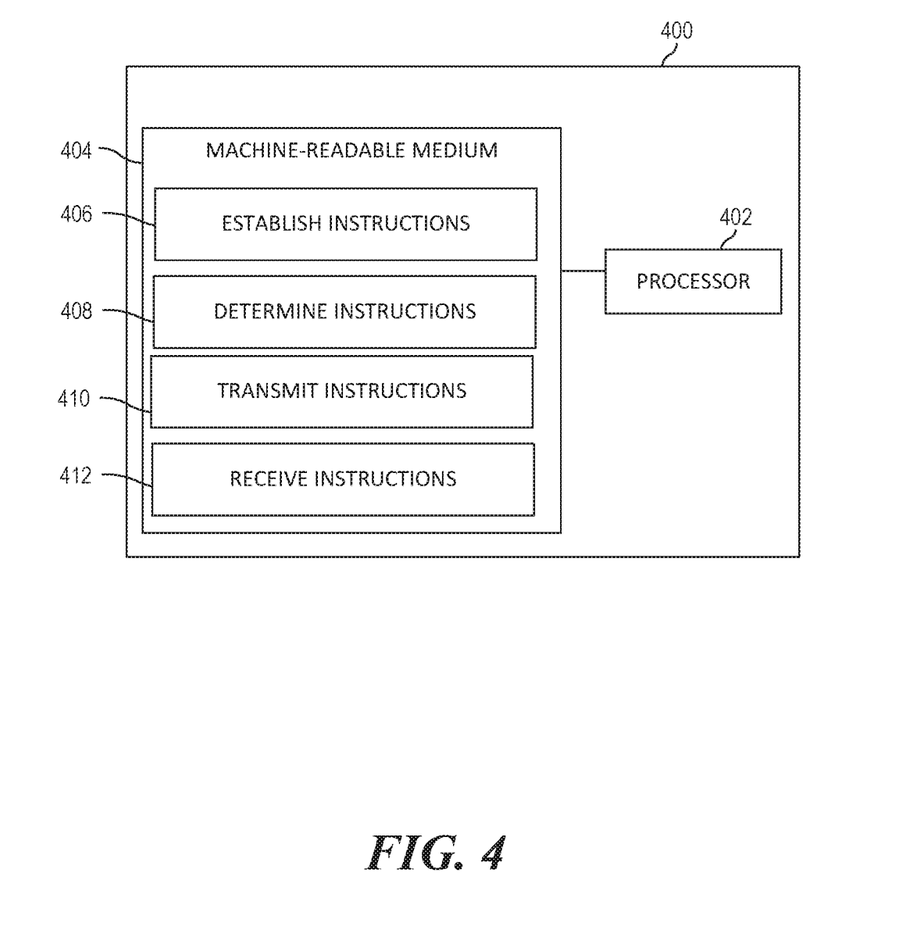
FIG. 4 is a block diagram for transmitting secure information.

FIG. 4 is a block diagram of an example system 400 for transmitting secure information. In the example illustrated in FIG. 4, system 400 includes a processing core 402. Although the following descriptions refer to a single processing core, the descriptions may also apply to a system with multiple processing cores. In such examples, the instructions may be distributed (e.g., executed by) across multiple processing cores.

Processor 402 may be at least one central processing unit (CPU), microprocessor, and/or other hardware devices suitable for retrieval and execution of instructions. In the example illustrated in FIG. 4, processor 402 may fetch, decode, and execute instructions 406, 408, 410 and 412 to perform transmitting secure information. In some examples, instructions 406, 408, 410 and 412 may be stored on a machine-readable medium. The machine-readable medium may include any volatile memory, non-volatile memory, or any suitable combination of volatile and non-volatile memory. Machine-readable medium 404 may comprise, for example, may be, for example, Random Access Memory (RAM), an Electrically-Erasable Programmable Read-Only Memory (EEPROM), a storage drive, an optical disc, and/or other suitable memory. Machine-readable medium 404 may also include a random access non-volatile memory that can retain content when the power is off. Processor 402 may include at least one electronic circuit comprising a number of electronic components for performing the functionality of at least one of the instructions. With respect to the executable instruction representations (e.g., boxes) described and shown herein, it should be understood that part or all of the executable instructions and/or electronic circuits included within one box may be included in a different box shown in the figures or in a different box not shown.

Referring to FIG. 4, establish instructions 406, when executed by a processor (e.g., 402), may cause system 400 to establish a secure connection with a boot environment on a special port of an admin node. An authentication key for the secure connection may be preloaded in the boot environment. The special port may be a SSH port used for initial transfer of secure information to new nodes marked for installation. Determine instructions 408, when executed by a processor (e.g., 402), may cause system 400 to determine, by the admin node, whether the new node is marked for installation. Determine instructions 408 may also cause system to determine whether the new node is diskless.

Transmit instructions 410, when executed by a processor (e.g., 402), may cause system 400 to transmit a secure key to the new node over the secure connection when it is determined that the new mode is marked for installation and/or that the new node is diskless. The secure key may be transmitted to a root access level path of the boot environment and/or new node. The secure connection may be disconnected after the secure key has been transmitted to the new node.

Receive instructions 412, when executed by a processor (e.g., 402), may cause system 400 to receive a request from the boot environment to transmit a secure bundle to a memory of the boot environment. The secure bundle may be protected by the secure key and the secure bundle may contain secure information that is not included in an installation image for the new node. Receive instructions may further cause system 400 to transmit the secure bundle to the new node. The secure connection may be disconnected after the secure bundle has been transmitted to the new node.

The foregoing disclosure describes a number of examples of transmitting secure information. The disclosed examples may include systems, devices, computer-readable storage media, and methods for transmitting secure information. For purposes of explanation, certain examples are described with reference to the components illustrated in FIGS. 1-4. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

What is claimed is:

1. A method comprising:
    establishing, by a boot environment, a secure connection on a special port, wherein an authentication key for the secure connection is preloaded into the boot environment;
    requesting, by the boot environment over the secure connection, a secure key from an admin node;
    receiving, by the boot environment in response to a verification by the admin node that a new node is marked for installation, a secure key at a new node over the secure connection;
    requesting, by the boot environment, a secure bundle from the admin node, the secure bundle corresponding to the new node;
    decrypting, by the boot environment, the secure bundle using the secure key; and
    requesting, by the boot environment, an installation image for the new node, wherein the secure bundle contains secure information that is not included in the installation image.
2. The method of claim 1, wherein the new node is diskless.
3. The method of claim 1 comprising:
    disconnecting the secure connection after the secure key has been received at the new node.
4. The method of claim 1 comprising:
    deleting the boot environment from the new node upon installation of the installation image on the new node.
5. The method of claim 1 comprising:
    deleting the authentication key from the new node upon installation of the installation image on the new node.
6. The method of claim 1 wherein the secure bundle is stored on a special partition on a disk where the installation image is installed.
7. The method of claim 6 wherein the new node subsequently accesses the secure information from the special partition instead of receiving the secure information from the admin node.
8. The method of claim 1, further comprising:
    storing the secure bundle on a baseboard management controller.
9. The method of claim 1 wherein the secure key is received via a root access level path of the new node.
10. The method of claim 1 wherein the special port is a secure shell (SSH) port used for initial transfer of secure information to new nodes marked for installation.
11. The method of claim 1 wherein the secure bundle contains secure information used by the installation image installed on the new node.
12. A system comprising:
    a connection establisher to establish a secure connection between a boot environment and an admin node on a special port of the admin node, wherein connection information, including an authentication key, for the secure connection is preloaded into the boot environment;
    a secure key receiver to receive a secure key from the admin node over the secure connection in response to a verification by the admin node that a new node is marked for installation, wherein the secure key is for nodes marked for installation;
    a bundle receiver to:
        request a secure bundle corresponding to the new node, and
        receive, at a memory of the boot environment, a secure bundle from the admin node, the secure bundle corresponding to the new node;
    a bundle decrypter to decrypt the secure bundle using the secure key; and
    an image manager to install an installation image for the new node, wherein the installation image does not contain the secure information.
13. The system of claim 12 comprising:
    the connection establisher to disconnect the secure connection after the secure key has been transmitted to the new node.
14. The system of claim 12 comprising:
    a boot manager to delete the boot environment from the new node upon installation of the installation image on the new node.
15. The system of claim 12 comprising:
    a boot manager to delete the connection information from the new node upon installation of the installation image on the new node.
16. The system of claim 12 comprising:
    an information handler to subsequently access the secure information from a disk where the installation image is installed instead of receiving the secure information from the admin node.
17. A non-transitory machine-readable storage medium encoded with instructions, the instructions executable by a processor of a system to cause the system to:
    establish a secure connection with a boot environment on a special port of an admin node, wherein an authentication key for the secure connection is preloaded into the boot environment;

determine, by the admin node,
that a new node is marked for installation;
transmit a secure key to the new node over the secure connection;
receive, in response to the determination that the new node is marked for installation, a request from the boot environment to transmit a secure bundle to a memory of the boot environment wherein the secure bundle contains secure information, protected by the secure key, that is not included in an installation image for the new node; and
transmit the secure bundle to the memory of the boot environment.

18. The non-transitory machine-readable storage medium of claim 17, wherein the instructions executable by the processor of the system to cause the system to:
determine that the new node is diskless.

19. The non-transitory machine-readable storage medium of claim 17 wherein the special port is a secure shell (SSH) port used for initial transfer of secure information to new nodes marked for installation.

20. The non-transitory machine-readable storage medium of claim 17 wherein the secure bundle contains secure information to be used by the installation image installed on the new node.

* * * * *